C. A. LINDSTRÖM.
SHIFTING BRAKE MAST.
APPLICATION FILED FEB. 20, 1911.
995,164.
Patented June 13, 1911.
3 SHEETS—SHEET 1.
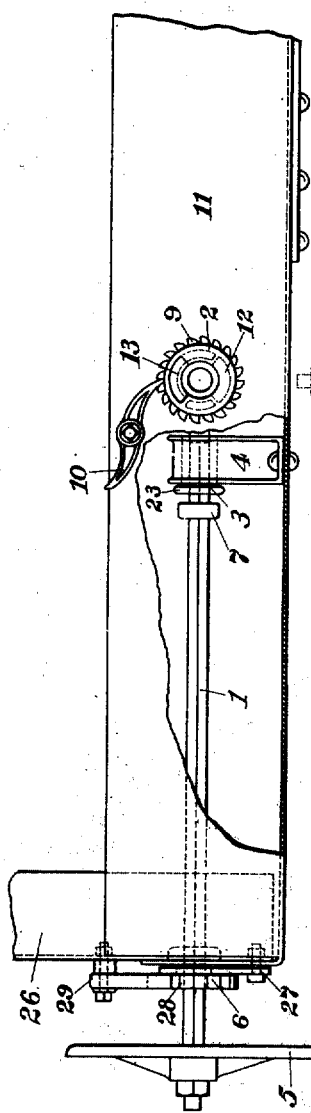
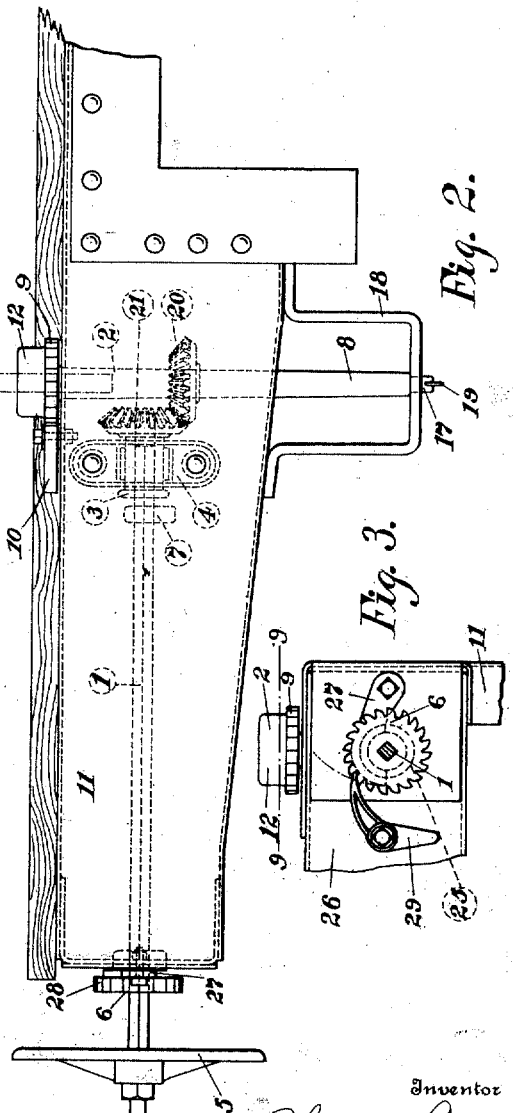

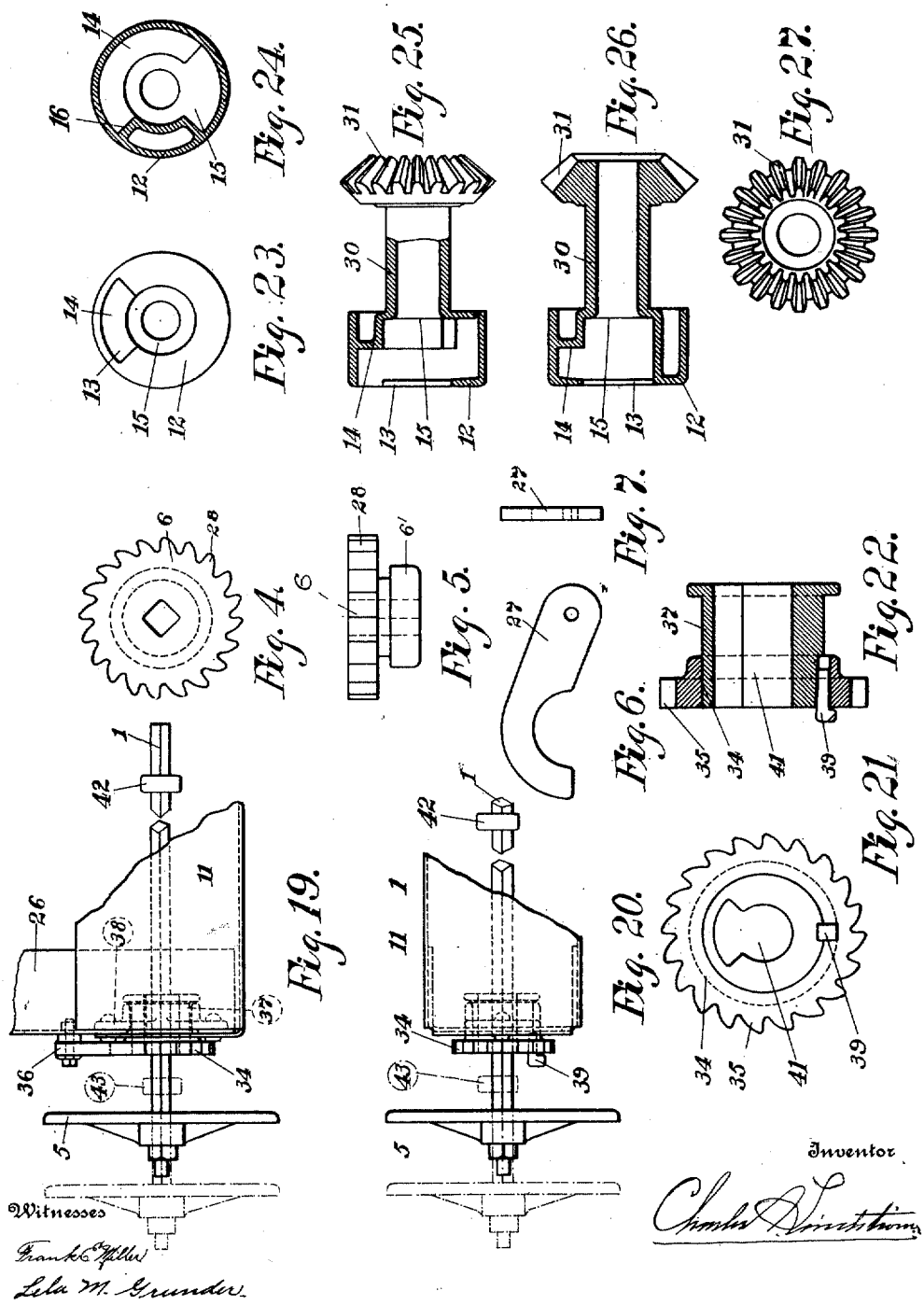

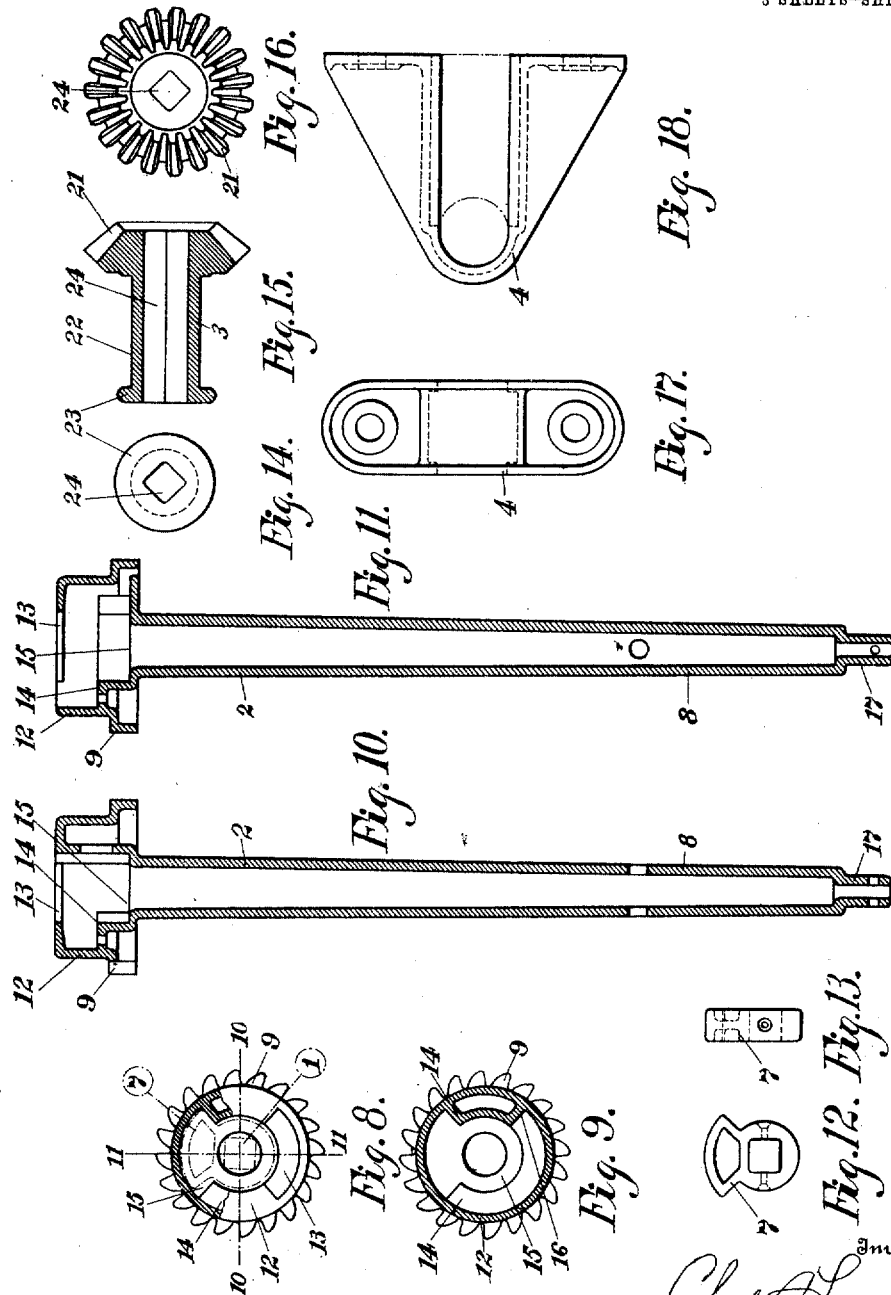

UNITED STATES PATENT OFFICE.

CHARLES A. LINDSTRÖM, OF PITTSBURG, PENNSYLVANIA, ASSIGNOR TO PRESSED STEEL CAR COMPANY, OF PITTSBURG, PENNSYLVANIA, A CORPORATION OF NEW JERSEY.

SHIFTING BRAKE-MAST.

995,164.     Specification of Letters Patent.     Patented June 13, 1911.

Application filed February 20, 1911. Serial No. 609,570.

*To all whom it may concern:*

Be it known that I, CHARLES A. LINDSTRÖM, a citizen of the United States, residing at No. 138 Stratford avenue, Pittsburg, E. E., in the county of Allegheny and State of Pennsylvania, have invented certain new and useful Improvements in Shifting Brake-Masts, of which the following is a specification.

An object of the present invention is to provide a brake mast of that type for use in flat cars, or in freight cars which have drop-ends or end doors, which are necessary where lading of great length is to be carried, or where lading of great weight is to be distributed over two cars.

A specific object of the present invention is to provide a knock-down, collapsible or separable brake mast, the operating portion of which may be moved out of the way from a point at the end sill when the car is used as above described so as not to interfere with the lading extending between the cars, and which can be readily replaced when the disposition of the lading will not interfere with its use.

A further specific object of the present invention is to provide a brake mast so constructed that the same may be readily thus separated into two parts and yet not accidentally separated due to jolting of the car; and in which the brake operating mechanism is so located within the end sill as to be protected from accidental damage.

A more specific object of the present invention is to provide a brake mast and brake operating mechanism so constructed that the mast is available for use in either a vertical or horizontal position, and manually operable either from the end sill of the car or from the level of the tracks, the provision for operating the mast in horizontal position from the track level being additional to the invention described and claimed in my pending application Serial No. 577,655.

The ordinary tilting brake mast which is applied to the outside of the end sill will not comply with the recent order of the Interstate Commerce Commission which requires that, " there shall be not less than four (4) inches clearance around rim of brake wheel. Outside edge of brake wheel shall be not less than four (4) inches from the vertical plane parallel with end of car and passing through the inside face of knuckle when closed with coupler-horn against the buffer-block or end sill" unless the coupler head be made to extend farther than usual beyond the buffer-block which would be objectionable for many reasons.

The improved shifting brake mast which is applied within the end sill and adapted to be used in a vertical or a horizontal position will comply with the order of the Interstate Commerce Commission without extending the coupler head further than usual beyond the end sill.

Referring now to the drawings in which like reference characters refer to like parts and in which:

Figure 1 is a plan view of the end sill of a car showing the improved brake mast mounted thereon; Fig. 2, is an end elevation of the same; Fig. 3 is a side elevation of the same; Figs. 4 and 5 are detail views of the ratchet wheel; Figs. 6 and 7 are detail views of the keeper; Fig. 8 is a plan view of the vertical clutch member with a part of the housing broken away; Fig. 9 is a sectional plan view of the same on the line 9—9, Fig. 3; Fig. 10 is a sectional view of the same on the line 10—10, Fig. 8; Fig. 11 is a similar view on the line 11—11, Fig. 8; Figs. 12 and 13 are detail views of the clutch toe; Figs. 14, 15 and 16 are detail views of the combined clutch and gear wheel; Figs. 17 and 18 are details of the horizontal clutch member bearing; Figs. 19 and 20 show a plan and end view respectively of a modified form of the brake mast; Figs. 21 and 22 are detail views of a modified form of the ratchet wheel; Figs. 23, 24, 25, 26 and 27 are detail views of a modified form of the combined clutch and gear wheel.

The vertical clutch member hereinafter described briefly is described more fully in my prior application for removable brake staff, filed August 17th, 1910, Serial No. 577,655.

Referring now in detail to the drawings, 1 represents the shiftable portion of the brake mast, 2 the vertical clutch member, 3 the combined horizontal clutch member and gear wheel, and 4 a bearing for the combined horizontal clutch member and gear wheel.

The shiftable portion 1 of the brake mast is provided at one end with the ordinary hand wheel 5, and a ratchet wheel 6, the use of which is hereinafter described, and at the other end is provided with a clutch toe or member 7, for engagement with the vertical clutch member 2.

The vertical clutch member 2 is cylindrical in shape and consists of a chain winding portion 8, a ratchet 9 for engagement of the pawl 10 which is pivotally mounted on the end sill 11, and a clutch housing 12. The top of clutch housing 12 is provided with an opening 13 which is circular at the central portion of the top and has a wedge shaped extension toward the circumference of the housing 12. The inside of housing 12 is hollow but provided with two levels, one level being formed by the upper or top surface of the clutch abutment 14. The lower or second level 15 is but slightly greater in extent than the clutch toe or member 7, and forms the bottom of a pocket or recess of substantially the same shape, the end walls of which are formed by the ends of the clutch abutment 14. The pocket is adapted to receive the clutch toe projection or member 7, after the latter has been passed through the opening 13 in the top of housing 12, and turned in the passageway formed by the top of the abutment 14 and the side wall and top of housing 12, until the toe or member 7 registers with and seats in said pocket or recesses by dropping to the level 15. The wedge shaped extension of the opening 13 is diametrically opposite to the wedge shaped portion of the pocket or recess formed by the level 15, abutment 14 and wall of housing 12. The top of the housing 12 extending over such pocket, forms a stop and prevents separation of the shiftable portion 1 and the vertical clutch member 2, without first raising the portion 1 to the level of the top of the abutment 14, and then turning it until the clutch toe 7 registers with the opening 13, so that it is not possible for the shiftable portion 1 and the vertical clutch member 2 to become accidentally separated, due to a severe jolt or shock, and yet the parts may be readily separated when desired.

For the purpose of facilitating intentional removal or shifting of the portion 1, a portion of the abutment 14 is extended upwardly to the top of the housing 12 to form an abutment 16, which is located at one side of the wedge shaped extension of the opening 13, so that when the toe projection or member 7, is raised to the top of abutment 14 and turned on such surface it finally strikes the abutment 16 and is then in registration with the opening 13, in which position the same may be easily lifted from the housing 12.

The lower end of the vertical clutch member 2 is contracted at 17, and is inserted in a perforation of the brake mast step 18, suitably mounted on the end sill 11. The contracted portion 17 is provided with a perforation through which a ring 19 is passed after the said contracted portion 17 has been inserted in the perforation of the brake mast step 18, to prevent any vertical movement. To the vertical clutch member 2 is secured a bevel gear wheel 20 which is adapted to mesh with and be operated by the gear wheel portion 21 of the combined horizontal clutch member and gear wheel 3. Besides having a bevel gear portion 21 the combined horizontal clutch member and gear wheel 3 is provided with a bearing portion 22 which rotates in the bearing 4 which is suitably mounted on the end sill 11, also an annular shoulder 23 to prevent horizontal movement, and an opening 24 of square or other suitable shape which is adapted to receive the end of the shiftable portion 1 when it is desired to use the brake mast in a horizontal position.

When it is desired to place the brake mast in a horizontal position the shiftable portion 1 is passed through the opening 25 in the side sill 26, until the end of portion 1 has been inserted a sufficient distance in the opening 24 of the combined horizontal clutch member and gear wheel 3, to form a connection therebetween. To prevent horizontal movement when the shiftable portion 1 is in horizontal operable position a keeper 27 is pivotally mounted on the side sill 26 and adapted to be retained in an annular recess or groove in the extension of the ratchet wheel 6. Ratchet wheel 6 is provided with a toothed portion 28 for engagement with the pawl 29 pivotally mounted on the side sill 26, and also with a shoulder 6' which revolves in a bearing formed by the edges of opening 25 in the side sill.

The vertical clutch member used in the preferred form and shown in Figs. 8, 9, 10 and 11, is identical with the vertical clutch member of the modified form.

The clutch portion of the modified horizontal clutch member and gear wheel shown in Figs. 23, 24, 25, 26 and 27 is identical with the clutch portion of the vertical clutch member of the preferred form. The bearing portion 30 and the bevel gear portion 31 shown in Figs. 25, 26 and 27 are identical with the bearing portion 22 and the bevel portion 21 of the preferred form. The shiftable portion of the modified form of brake mast is provided with two clutch toes or members 42 and 43 identical with the clutch toes 7 used in the preferred form. One of these clutch toes 42 is so located that it will engage the vertical clutch member when the shiftable portion is in a vertical position and with the combined horizontal clutch member and gear wheel when the shiftable portion 1 is in a horizontal position. The other clutch toe 43 is so located that it will engage with the ratchet wheel 34 hereinafter described.

Ratchet wheel 34 shown in Figs. 21 and 22 consists of a toothed portion 35 for engagement with the pawl 36 which is pivotally mounted on the side sill 26, and also a bearing portion 37, which rotates in a bearing 38 which is secured to the side sill 26. The toothed portion 35 and the bearing portion 37 being formed of two separate pieces are secured together by means of a key 39. The bearing portion 37 is provided with an annular shoulder which bears against the bearing 38 and prevents the ratchet wheel and bearing from shifting horizontally. The bearing portion 38 is also provided with an opening 41 of substantially the same shape as the clutch toe, to permit one of the clutch toes to pass therethrough, and so that the other clutch toe may engage therewith.

It will readily be seen from the foregoing description, that, should the brake mast when in a vertical position interfere with the lading, such brake mast may be unshipped from the vertical position and applied and operated in a horizontal position; or it may be removed altogether and stored in any convenient position about the car where the same will not be in the way or where it will not be liable to be damaged or lost.

I am aware that minor changes in the construction, arrangement and combination of the several parts of my invention can be made and substituted for these herein shown and described, without in any way departing from the nature and principle of my invention.

Having thus described the invention, what I claim as new and desire to secure by Letters Patent is:—

1. In a brake mast mechanism, for railway cars, a substantially vertical operated part, a substantially horizontal operated part operatively connected to said vertical operated part, and shiftable means for operating either said vertical or horizontal operated parts.

2. In a brake mast mechanism, a substantially vertical operated part, a substantially horizontal operated part, means for operatively connecting said vertical part and said horizontal part, and shiftable means for operating either said vertical or horizontal operated parts.

3. In a brake mast mechanism, a substantially vertical part, a substantially horizontal part operatively connected to said vertical part, a shiftable operating part and means for preventing accidental separation of the said operating part from the said vertical or horizontal parts.

4. In a brake mast mechanism, a horizontal operated part, a vertical chain winding part, operable means connecting said horizontal operated part and said vertical chain winding part, and removable means for operating said horizontal operated part.

5. In a brake mast mechanism, an operated part and an operating part in combination with a housing on one of said parts, means operatively connecting said parts within said housing, a second operated part operatively connected to said first operated part, and means for operatively connecting said operating part and said second operated part.

6. In a brake mast mechanism, a plurality of operatively connected operated parts, and shiftable means adapted to operate each of said operated parts.

7. In a brake mast mechanism, a vertical stationary section, a horizontal stationary section operatively connected to said vertical section and a shiftable section adapted to operatively engage either said vertical or horizontal stationary sections.

8. In a brake mast mechanism, a vertical stationary section, a horizontal stationary section operatively connected to said vertical section and a shiftable section adapted to operatively engage either said vertical or horizontal stationary sections, and means to secure said shiftable section against longitudinal movement when in engagement with said horizontal stationary section.

In testimony whereof I affix my signature in presence of two witnesses.

CHARLES A. LINDSTRÖM.

Witnesses:
  FRANK E. MILLER,
  LELA M. GRUNDER.

---

Copies of this patent may be obtained for five cents each, by addressing the "Commissioner of Patents, Washington, D. C."